US011528276B2

(12) United States Patent
Albero et al.

(10) Patent No.: US 11,528,276 B2
(45) Date of Patent: Dec. 13, 2022

(54) SYSTEM FOR PREVENTION OF UNAUTHORIZED ACCESS USING AUTHORIZED ENVIRONMENT HASH OUTPUTS

(71) Applicant: BANK OF AMERICA CORPORATION, Charlotte, NC (US)

(72) Inventors: George Albero, Charlotte, NC (US); Elijah Clark, Charlotte, NC (US); Scot Lincoln Daniels, Clover, SC (US); Emanuel David Guller, Charlotte, NC (US); Konata Stinson, Charlotte, NC (US); Rick Wayne Sumrall, Charlotte, NC (US); Jake Michael Yara, Mint Hill, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 64 days.

(21) Appl. No.: 16/850,793

(22) Filed: Apr. 16, 2020

(65) Prior Publication Data
US 2021/0328995 A1 Oct. 21, 2021

(51) Int. Cl.
*H04L 9/40* (2022.01)
*H04L 9/32* (2006.01)

(52) U.S. Cl.
CPC ......... *H04L 63/102* (2013.01); *H04L 9/3236* (2013.01); *H04L 63/08* (2013.01); *H04L 2463/082* (2013.01)

(58) Field of Classification Search
CPC ...... H04L 63/102; H04L 9/3236; H04L 63/08
See application file for complete search history.

(56) References Cited

U.S. PATENT DOCUMENTS

| 7,577,848 | B2 | 8/2009 | Schwartz et al. |
| 7,711,960 | B2 | 5/2010 | Scarlata |
| 7,958,373 | B2 | 6/2011 | Manferdelli et al. |
| 8,166,304 | B2 | 4/2012 | Murase et al. |
| 8,335,317 | B2 | 12/2012 | Vanstone et al. |
| 8,352,484 | B1 | 1/2013 | Schneider |
| 8,352,739 | B2 | 1/2013 | Park et al. |
| 8,381,303 | B2 | 2/2013 | Mahaffey |
| 8,468,602 | B2 | 6/2013 | McDougal et al. |
| 8,555,089 | B2 | 10/2013 | Ito et al. |
| 8,656,146 | B2 | 2/2014 | Findeisen et al. |
| 8,782,435 | B1 | 7/2014 | Ghose |
| 8,966,318 | B1 | 2/2015 | Shah |

(Continued)

*Primary Examiner* — Jason Chiang

(74) *Attorney, Agent, or Firm* — Moore & Van Allen PLLC; Jeffrey R. Gray

(57) ABSTRACT

When a system tries to access a network (e.g., another system, an application, data, or the like) at least two-factor authentication may be used to validate the system. At least one authentication factor may include utilizing authentication credentials of the entity or system accessing the network. At least a second authentication factor may include using an environment hash of the system, which is a representation of the configuration (e.g., hardware, software, or the like) on the system trying to access the network. The environment hash may be compared to hash requirements (e.g., authorized environment hashes, unauthorized environment hashes, or the like) to aid in the validation. The system may only access the network when both the authentication credentials and the environment hashes meet requirements.

20 Claims, 4 Drawing Sheets

(56) References Cited

U.S. PATENT DOCUMENTS

| | | | |
|---|---|---|---|
| 9,059,853 B1* | 6/2015 | Bortz | H04L 67/2809 |
| 9,087,199 B2* | 7/2015 | Sallam | G06F 21/566 |
| 9,088,606 B2 | 7/2015 | Ranum et al. | |
| 9,237,161 B2 | 1/2016 | Humble et al. | |
| 9,264,220 B2 | 2/2016 | Gehrmann et al. | |
| 9,294,486 B1 | 3/2016 | Chiang et al. | |
| 9,305,159 B2* | 4/2016 | Fanton | H04L 9/0643 |
| 9,363,087 B2* | 6/2016 | Hawblitzel | H04L 9/3268 |
| 9,425,965 B2 | 8/2016 | Baumann et al. | |
| 9,491,142 B2 | 11/2016 | Xie et al. | |
| 9,661,009 B1 | 5/2017 | Karandikar et al. | |
| 9,705,677 B2 | 7/2017 | Oxford | |
| 9,779,249 B2 | 10/2017 | Wilson et al. | |
| 9,838,408 B1 | 12/2017 | Karandikar et al. | |
| 9,910,987 B2 | 3/2018 | Niemela | |
| 9,916,443 B1* | 3/2018 | Qu | G06F 21/554 |
| 9,967,333 B2 | 5/2018 | Chen et al. | |
| 9,990,504 B1 | 6/2018 | Chapman et al. | |
| 10,530,768 B2 | 1/2020 | Shteingart et al. | |
| 2004/0025011 A1 | 2/2004 | Azema et al. | |
| 2004/0158454 A1 | 8/2004 | Polanyi et al. | |
| 2005/0021935 A1 | 1/2005 | Schillings et al. | |
| 2006/0090084 A1 | 4/2006 | Buer | |
| 2006/0136332 A1 | 6/2006 | Ziegler | |
| 2007/0033419 A1 | 2/2007 | Kocher et al. | |
| 2007/0260738 A1 | 11/2007 | Palekar et al. | |
| 2009/0249492 A1 | 10/2009 | Boesgaard Sorensen | |
| 2009/0288167 A1 | 11/2009 | Freericks et al. | |
| 2011/0211697 A1 | 9/2011 | Volkovs | |
| 2011/0246778 A1 | 10/2011 | Duane | |
| 2012/0054843 A1* | 3/2012 | Horman | H04L 63/0823 726/7 |
| 2012/0151206 A1* | 6/2012 | Paris | H04L 9/3234 713/155 |
| 2012/0331526 A1* | 12/2012 | Caudle | G06F 21/6209 726/4 |
| 2013/0117848 A1 | 5/2013 | Golshan et al. | |
| 2013/0276056 A1 | 10/2013 | Epstein | |
| 2014/0114857 A1 | 4/2014 | Griggs et al. | |
| 2015/0244716 A1* | 8/2015 | Potlapally | G06F 21/57 713/155 |
| 2016/0112538 A1* | 4/2016 | Wo | G06F 21/552 709/225 |
| 2016/0248809 A1 | 8/2016 | Smith et al. | |
| 2016/0294802 A1* | 10/2016 | Xiao | H04L 63/083 |
| 2017/0116413 A1 | 4/2017 | Takacs et al. | |
| 2017/0214701 A1 | 7/2017 | Hasan | |
| 2017/0249483 A1* | 8/2017 | Kawazu | G06F 21/64 |
| 2017/0264593 A1* | 9/2017 | Biswal | H04L 9/0861 |
| 2017/0331837 A1* | 11/2017 | Moon | H04L 65/608 |
| 2018/0191726 A1 | 7/2018 | Luukkala | |
| 2018/0276374 A1 | 9/2018 | Baldwin et al. | |
| 2019/0089720 A1 | 3/2019 | Aditham et al. | |
| 2021/0136063 A1* | 5/2021 | Cheek | G06Q 20/382 |
| 2021/0160265 A1 | 5/2021 | Chittaro | |
| 2021/0192065 A1 | 6/2021 | Cuka et al. | |
| 2021/0306303 A1* | 9/2021 | Lewin | H04L 63/0281 |
| 2021/0390193 A1 | 12/2021 | Sloane | |
| 2022/0108004 A1 | 4/2022 | Corey et al. | |

* cited by examiner

SYSTEM FOR PREVENTION OF UNAUTHORIZED ACCESS USING AUTHORIZED ENVIRONMENT HASH OUTPUTS

FIELD OF THE INVENTION

The present disclosure relates to a system that provides improved security for a network, and in particular, preventing a system from accessing, or isolating the system from, the network through the use of cryptographic hashes.

BACKGROUND

Identifying changes, or lack of changes, to hardware, software, and data on systems is difficult to implement and maintain. Consequently, the configurations of a system may make the system unauthorized and/or non-compliant, thus opening the system to potential threats. The threats may spread to other systems on the same network if the threats are not identified and mitigated. There is a need to provide improvements to the security of a network and/or the systems on the network.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure includes verifying a configuration (e.g., hardware, software, data therein, or the like) before the system is updated with the configuration and/or validating a configuration of a system before allowing the system to access a network and/or before allowing a system to maintain a connection with a network.

With respect to the verification of a configuration, the updated configuration for a system may be verified on a virtual environment before actually being implemented on the system. Hashes may be utilized in order to define the configurations of the system being verified (e.g., regardless of whether or not the configurations are validated), as will be described in further detail herein. The hashes may define the entire configurations, or portions thereof, of the system (e.g., hardware, software, data thereof, or the like). The hashes may be created by the virtual systems, by the systems on which the configurations are proposed to be changed, and/or other systems. The hashes of the configurations may be created before allowing the configurations to be updated on the systems (e.g., before allowing the software tested on the virtual environment to be updated to the system). As such, in some embodiments of the invention the hashes determined for a configuration may be compared against hash requirements (e.g., authorized hashes, unauthorized hashes, similarities or differences between hashes of the same system or other systems, or the like). When the hashes for the proposed configuration meet the hash requirements, the configuration may be implemented on the system. For example, the hardware may be implemented on the actual system, the software may be installed on the system, the data may be stored in the system, the system may run the code on the system, or the like.

In some embodiments, in order to validate the configurations on a virtual environment, the virtual environment may accelerate (e.g., one minute equals one day, one minute equal one year, or the like) the operation of the configuration (e.g., operation of the software, hardware, or the like) of the system in order to identify any harmful code (e.g., time bombs, malware, trojan horses, or the like as will be discussed in further detail herein) in the proposed updated configuration. The hashes defining the configurations for each of the systems on the network may be stored on a hash database for future use.

During the operation of the systems the hashes of the systems may be reviewed when the systems try to take an action, such as when the systems try to access a network or when systems already on the network access other systems, when the systems try to maintain access the network, or the like. For example, when a system tries to access a network (e.g., another system, an application, data, or the like) the hash of the system may be compared against hash requirement. The system may only access the network when the hash of the system meets the hash requirements. In other examples, a system already on a network may be analyzed when the system takes an action or may be periodically reviewed in order to determine if the system should be allowed to continue to operate on the network. When the hash of the system meets the hash requirements the system may be allowed to continue to operate on the system or may be allowed to take the action on the network. In some embodiments, the hash requirements may be stored authorized hashes, stored unauthorized hashes, past hashes for the same system, hashes for other systems with the same or similar configurations, or the like. When the hash of the system fails to meet a hash requirement, the system may be prevented from accessing a network and/or isolated from a network and investigated for a non-compliant configuration.

The virtual environment system described herein may be used for validating configurations of systems, and in particular, validating executable data using authorized hash outputs. In particular, the virtual environment system may generate a virtual environment, where the virtual environment is logically and/or physically separated from other devices and/or environments within the network. The system may then open a specified set of executable data within the virtual environment and perform a set of commands or processes with respect to the executable data. Alternatively, the virtual environment may execute all of the data within the computer. If the system determines that the configuration of the system (e.g., the hardware, software, data, the executable code, or the like) is safe to run, the system may generate a hash output of the configuration (e.g., hardware, software, data, the executable data, or the like) of the system being verified within the virtual environment, and store the hash output in a database of authorized configurations. If the system determines that the configuration of the system is not safe to run, the generated hash may be added to a database of unauthorized configurations. In this way, the system may securely generate a repository of authorized hashes and/or unauthorized hashes such that the system may ensure that only safe configurations are able to run on the computing systems within the network.

Embodiments of the invention comprise systems, methods, and computer program products for improving security of networks using environment hashes. Some embodiments of the invention comprise receiving a request from an entity to access a network through the use of an entity computer system. Embodiments of the invention further comprise receiving authentication credentials from the entity and comparing the authentication credentials from the entity with authentication requirements. The embodiments further comprise identifying an environment hash for the entity computer system and comparing the environment hash for the entity computer system with hash requirements. Thereafter, the entity computer is either allowed to access the network when the entity computer system is validated, or prevented from accessing the network when the entity computer system fails to be validated, based on the comparison of the authentication credentials and the authentication requirements and/or the environment hash and the hash requirements.

In further accord with embodiments of the invention, identifying the environment hash comprises identifying the environment hash stored on the entity computer system.

In other embodiments of the invention, identifying the environment hash comprises identifying the environment hash for the entity computer system stored in a hash database system.

In still other embodiments of the invention, identifying the environment hash comprises creating the environment hash based on a configuration of the entity computer system.

In yet other embodiments of the invention, the hash requirements are stored within a hash database system, and wherein the hash requirements comprise at least authorized environment hashes or unauthorized environment hashes.

In further accord with embodiments, the invention further comprises preventing the entity computer system from making future requests when the entity computing system is prevented from accessing the network.

In other embodiments of the invention, preventing the entity computer system from making the future requests comprises identifying a computer identifier for the entity computer system and storing the computer identifier as a stored computer identifier for restricting communication with the network. Thereafter, the entity computer system is identified as trying to communicate with the network. A determination is made that when the computer identifier of the entity computer system matches the stored computer identifier, the entity computer system is prevented from making a second request on the network.

In still other embodiments of the invention, the authentication credentials comprise a user identifier and a password, a secure token, biometric information, a computer identifier, an image, or a gesture.

In yet other embodiments of the invention, the environment hash comprises a cryptographic hash output value comprising of a fixed-length character string.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
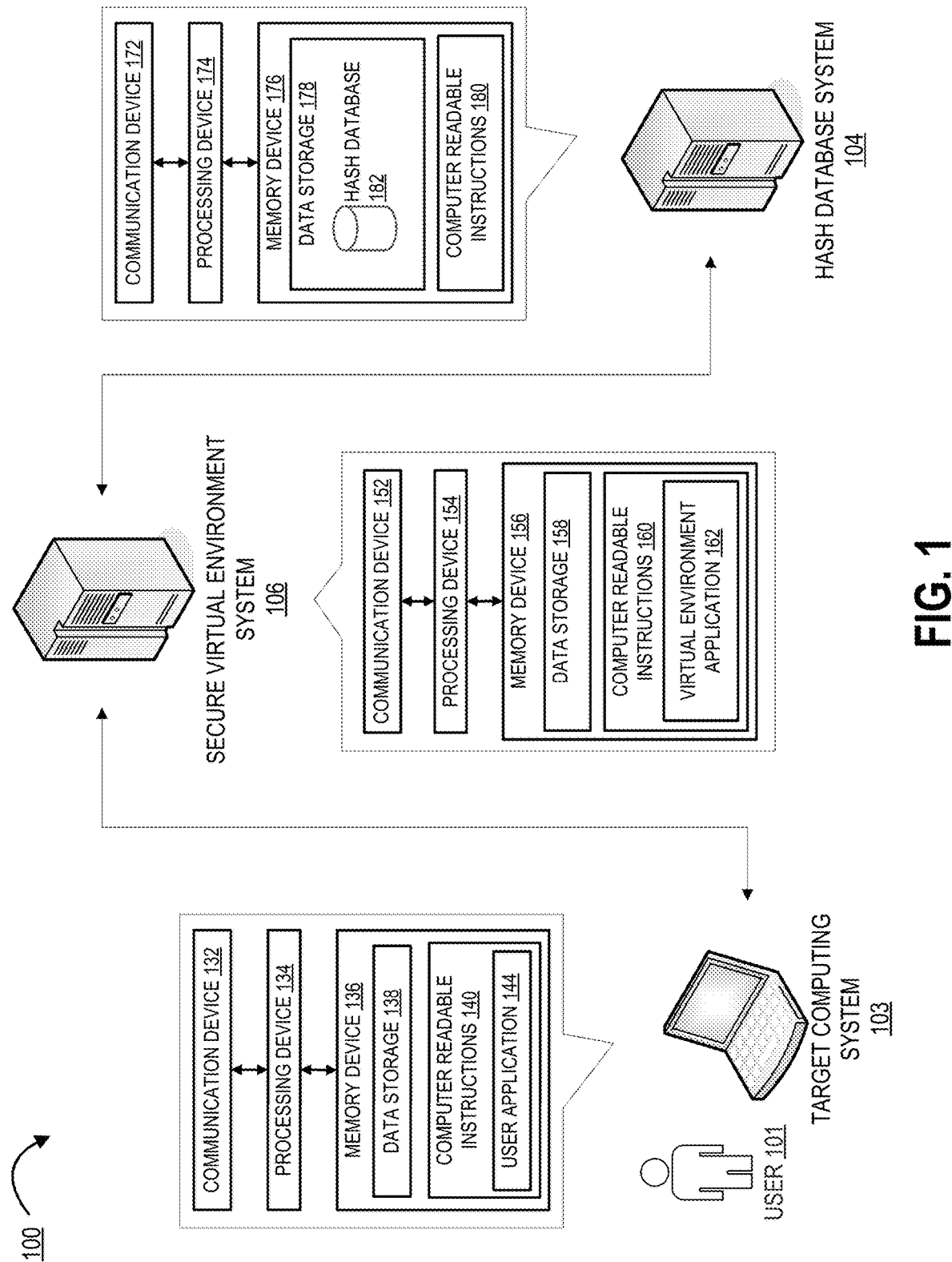

Having thus described embodiments of the invention in general terms, reference will now be made to the accompanying drawings, wherein:

FIG. 1 illustrates an operating environment for the secure virtual environment system, in accordance with embodiments of the present disclosure.

Figure 2:
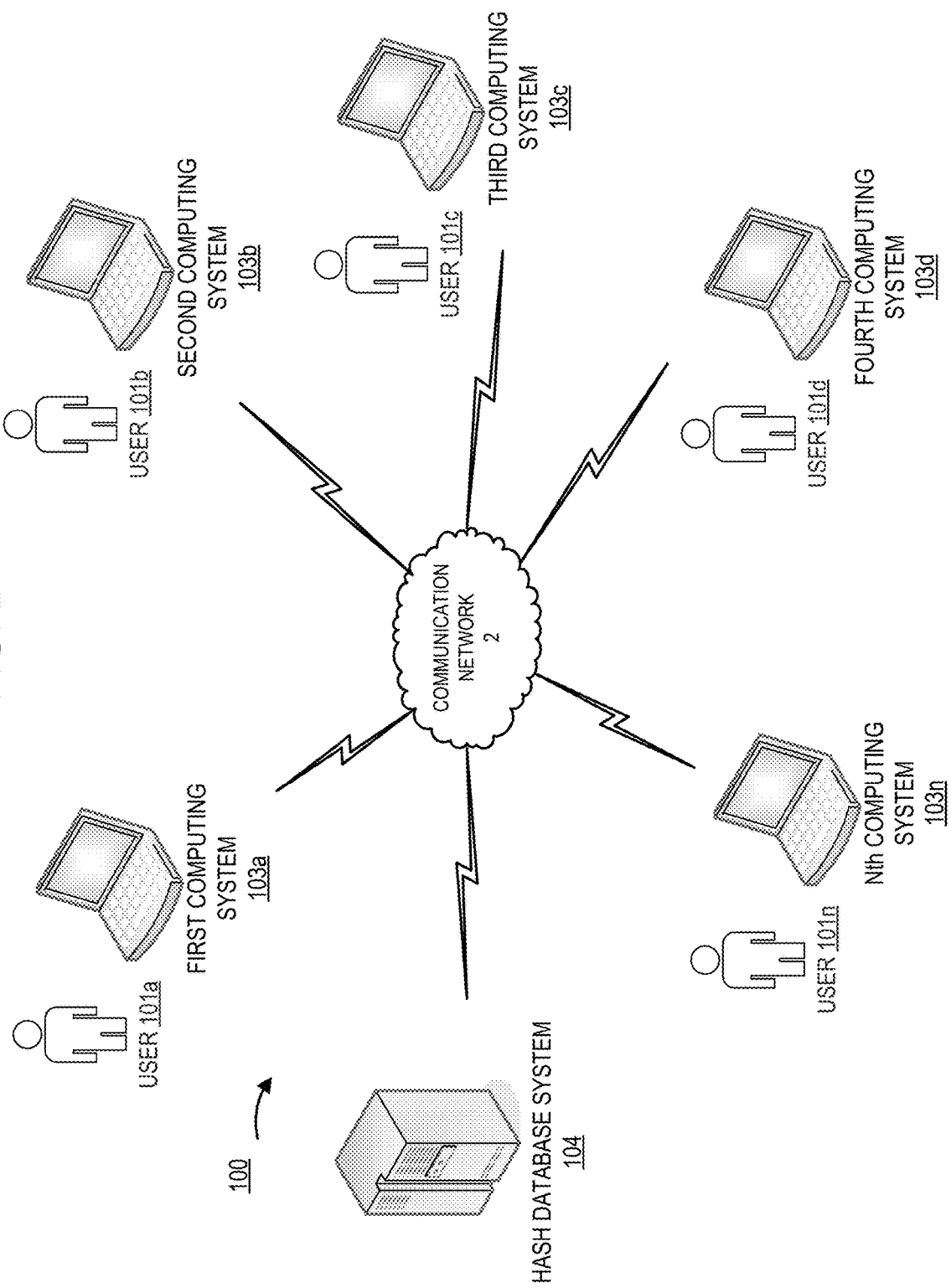

FIG. 2 illustrates a network environment for the computer systems, in accordance with embodiments of the present disclosure.

Figure 3:
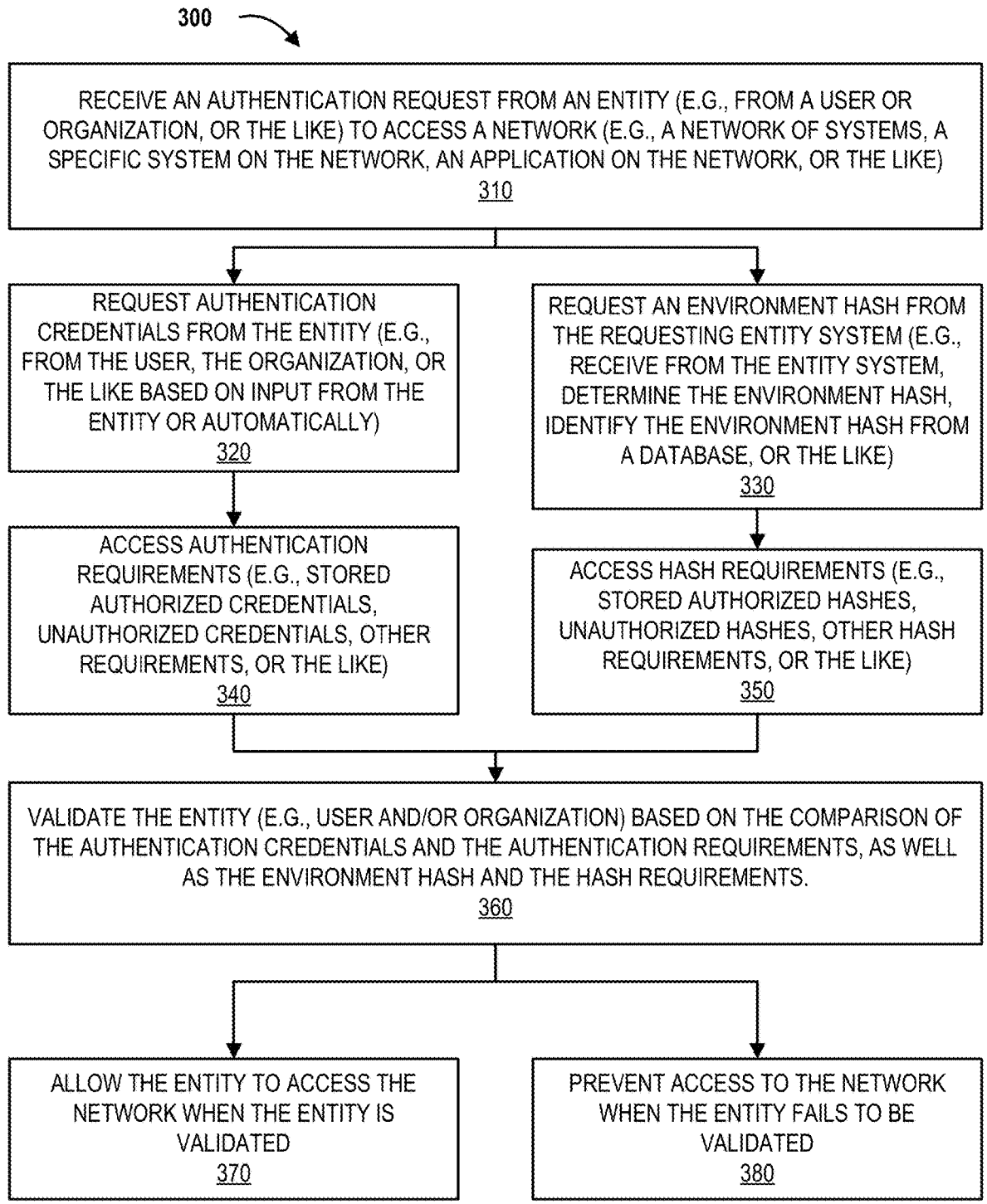

FIG. 3 illustrates a process flow for authenticating a computer system using hashes, in accordance with some embodiments of the present disclosure.

Figure 4:
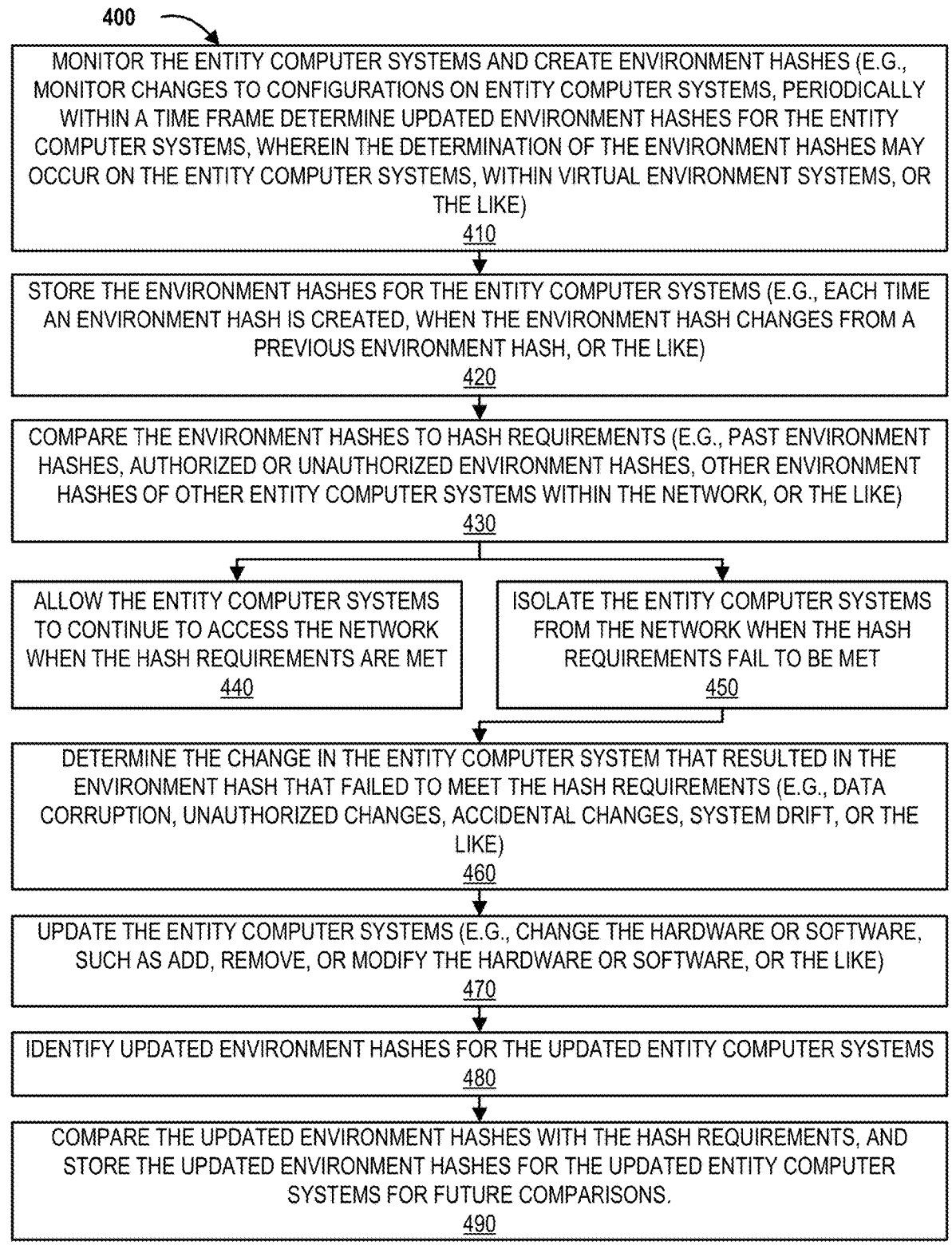

FIG. 4 illustrates a process flow for isolating a computer system using hashes, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual user or an organization that accesses and/or operates an online system of networked computing systems on which the system described herein is implemented. The entity may be a business organization, a non-profit organization, a government organization, or the like, a user acting on behalf of himself/herself or on behalf of the organization. The entity may routinely use various systems and/or applications within its systems to its individual or organizational objectives.

"Entity system" or "entity computer system" as used herein may refer to the computing systems, devices, software, applications, communications hardware, and/or other resources used by the entity to perform the functions as described herein. Accordingly, the entity system may comprise desktop computers, servers, Internet-of-Things ("IoT") devices, networked terminals, mobile devices (e.g., smartphones, smart devices such as smart watches, smart glasses, laptop computers, or the like), network connections, and/or other types of computing systems or devices and/or peripherals along with their associated applications.

"Computing system" or "computing device" as used herein may refer to a networked computing system used by any entity, for example, an entity computer system. The entity computing system may include a processor, a non-transitory storage medium, a communications device, and a display. The computing system may be configured to support user logins and inputs from any combination of similar or disparate devices. Accordingly, the computing system may be a portable electronic mobile device such as a smartphone, tablet, single board computer, smart device, laptop, or the like. In other embodiments, the computing system may be a stationary unit such as a personal desktop computer, networked terminal, IoT device, kiosk, or the like.

"User" as used herein may refer to an individual who may interact with the entity system (e.g., a user computer system, an organization system, or the like) to access the functions therein. Accordingly, the user may be an individual acting for the user's own benefit, or an agent, employee, associate, contractor, or other authorized party acting for the benefit of an organization. The user may access, use, administrate, maintain, and/or manage the entity computer systems (e.g., a user computer system, an organization computer system, or the like). In other embodiments, the user may be a client or customer of the organization.

Accordingly, the term "user computing system" may refer to "user mobile devices," such as mobile phones, personal computing devices, tablet computers, wearable devices, or other portable electronic devices, or the like, or other user computing systems such as any stationary device, all of which may be capable of receiving and/or storing data therein.

"Data transformation algorithm" as used herein may refer to a set of logical and/or mathematical operations or processes that may be executed on a specified segment of data to produce a transformation output. Accordingly, in some embodiments, the data transformation algorithm may be a cryptographic hash function or hash algorithm (e.g., MD5, Secure Hash Algorithm/SHA, or the like) which, given a specified data input, produces a cryptographic hash output value (e.g., a fixed-length character string).

"Virtual environment" as used herein may refer to a computing environment that may be physically and/or logically isolated from other environments and/or computing systems within the network. "Virtual environment instance" as used herein may refer to a particular configuration of a virtual environment that may be created for a given time period. Each virtual environment instance may have separately allocated resources, processes, system files, drivers, and applications. Accordingly, processes or code that may be executed within a virtual environment instance will only affect the state of the virtual environment instance.

"Harmful code" as used herein may refer to a computer virus, worm, trojan horse, spyware, adware, back door, malware, time bomb, or the like whose purpose is to damage or interfere with a computer system. "Malware" as defined herein may refer to executable code which may cause the execution of one or more unwanted or unauthorized processes on a target computing system (e.g., deleting or corrupting files, modifying data, encrypting files, or the like). "Logic bomb" as used herein may refer to a specific type of harmful code that may execute unwanted or unauthorized processes upon detecting the occurrence of certain specific conditions. Examples of such conditions may include the occurrence of a particular date, the passage of a designated amount of time, execution of certain operations, or the like.

Executable code that causes execution of unauthorized processes may cause and/or create unintentional consequences that may create significant operational impacts on the computing systems within a network. Accordingly, an entity may wish to perform validation and security testing of executable code (e.g., firmware, software applications, updates and patches, or the like) before the installation of the executable code is permitted to be executed and/or installed onto a computer such as the entity's computing systems on a network. In this regard, an entity's system may generate a virtual environment instance in which executable code may be tested and validated for execution and/or installation. Once the executable code is ready to be tested within the virtual environment, the system may execute a set of operations or commands with respect to the executable code (e.g., installing the application, using certain functions or features of the application, performing system processes, installing software updates, and the like).

One or more systems may generate a log of all actions performed within the virtual environment along with the outcomes associated with the actions performed. For instance, such outcomes may include the discovery of harmful code, software incompatibilities, driver faults, operating system errors, application bugs and/or instability, or the like. If the system detects that the execution of the set of operations on the executable code has not caused any detrimental outcomes to appear, the system may validate the executable code (e.g., determine that the executable code is safe to execute). In some embodiments, validating the executable code may be conditional on certain factors. For example, the executable code may be validated only with respect to certain computing systems having a particular configuration (e.g., software and/or hardware configurations). Once the executable code is validated, the system may input the executable code into a data transformation algorithm to produce a data output for the specific executable code being tested. For instance, the data transformation algorithm may be a hash algorithm such as SHA such that a hash output is generated from the executable code. The hash output associated with the configuration may then be stored in an authorized/validated hash database.

Once the validated hash database is generated, new sets of executable code may be hashed to produce new hash outputs. If the new hash output matches a hash stored within the validated hash database, the system may recognize the executable code as validated, and thus authorize the installation and/or execution of the executable code. If no match is detected, the system may require that the new executable code, is evaluated within the virtual environment before it is permitted to be implemented (e.g., installed, executed, or the like). In some embodiments, the system may further comprise an unauthorized hash database comprising a list of executable code that the system has determined to produce undesirable effects in computing systems (e.g., the executable code contains harmful code, causes instability or crashes, or the like). In such embodiments, if the hash of a particular executable code matches a hash found within the unauthorized hash database, the system may automatically block the implementation of the executable code (e.g., installation and/or execution of a set of executable code). In this way, the system may provide a secure way to perform validation testing of executable code that may reveal issues that may not be detectable based on viewing in the code, such as a line-by-line analysis of code.

In some embodiments, the system may only allow validated executable code, to be installed and/or executed on certain designated computing systems. As such, as described above not only is the executable code being validated, but the configuration of the computer system may also be validated (e.g., the entire computer system, or portions thereof). For example, certain executable code may only be validated to run on computing systems having specific hardware and/or software configurations (e.g., to avoid unforeseen compatibility issues, or the like). As such, the system, such as the virtual environment system may validate the configurations of the entity computer system (e.g., the entire system or specific portions thereof) in the same or similar way as described above with respect to validating the executable code. Therefore, the system may generate hash outputs of the environment in which the validated executable code is to be installed and/or executed (referred to herein as "environment hashes"). The environment hashes may be generated using specified core information about the configuration of such computing systems (e.g., operating system platform and version, hardware on the system, processor architecture, installed software, or the like). The environment hash may then be stored within the validated hash database (or within an environment hash database).

Subsequently, before installing or executing a particular set of executable code, computing systems may be required to not only generate a hash of the executable code for validation checking against the values within the validated hash database, but may further be required to generate an environment hash based on currently detected environment hash variables for validation checking against the values within the environment hash database. If a mismatch is detected in the hash values of the executable code or of the environment (e.g., the computing system has experienced a core hardware or software change, or the like), the system may prevent the execution of the executable code until the mismatch is remediated (e.g., the executable code and/or environment are re-validated and their respective hashes are updated within the hash database).

An exemplary embodiment is provided as follows for illustrative purposes. In one embodiment, a user (e.g., an employee or third party contractor of an entity) may be tasked with deploying a software update on the entity computing systems within an onsite network. The software update may be stored, for instance, on a portable flash memory drive held by the user. In such an embodiment, the system may comprise a designated computing system (e.g., a kiosk, or the like) which may be dedicated to running the virtual environment in which executable code is to be tested. In another embodiment, the virtual environment may be implemented on a portable drive which may be connected to another computing system to generate instances of the virtual environment on the computing system (e.g., the computing system to receive the update). Alternatively, the computer system may be on a network, and thereafter may be isolated on a separate virtual network away from its usual network.

The user may access the software update through the virtual environment (e.g., by connecting the portable drive containing the update to the kiosk, or the like). In some embodiments, the user may select a predetermined set of operations to be executed with respect to the software update (e.g., installation, troubleshooting, or the like). In this regard, the virtual environment may display a user interface of the operating system on which the update is to be installed. In this regard, the virtual environment may simulate the exact hardware and/or software configuration of the computing systems on which the software update is to be deployed. In this way, the user may go through a process of installing the update within the virtual environment that is identical to the process of installing the update on the target computing systems. In other embodiments, the system may automatically execute the predetermined set of operations based on the identity of the executable code to be tested, which may be determined according to file extensions, metadata, or the like. In such embodiments, the system may automatically detect the occurrence of any unauthorized or undetected activity during the testing process.

If such activity is detected by the system, the kiosk may provide feedback to the user indicating the presence of such activity. For instance, a display (e.g., a monitor, projector, or the like) of the kiosk may display an indication that the executable code is not safe to run (e.g., a red screen or a "NO GO" message). In response, the employee may recognize that the update is not to be installed on any of the computing systems on site. On the other hand, if no undesirable activity is detected during testing or if the hash of the software update matches a hash within the validated hash database, the kiosk may display an indication that the executable code is safe to run (e.g., a green screen or a "GO" message). In such scenarios, the employee may be confident that the software update may be deployed without incident. Upon completion of the validation process, the system may generate a hash of the tested code and store the hash within the validated hash database (or unauthorized hash database in some embodiments).

In other exemplary embodiments, the environment hashes discussed herein may also be used to validate entity computer systems (e.g., target computer systems that have be updated and are trying to access or are operating on the network). As will be described in further detail herein, when an entity computer system tries to access a network (e.g., join a network, communicate with the network, access another system on the network, access an application on a system in the network, or the like) the environment hash of the entity computer system may be identified (e.g., captured from a stored location, determined in a virtual environment, or the like) and compared against hash requirements. If the environment hash meets the hash requirement then the entity computer system may be allowed to access the network. Alternatively, if the environment hash fails to meet the hash requirement then the entity computer system may be prevented from accessing the network.

Alternatively, or additionally, in other exemplary embodiments, the environment hashes discussed herein may also be used to validate entity computer systems that are already on a network. As will be described in further detail herein, when an entity computer system on a network is updated and/or periodically the environment hash of the entity computer system may be determined (e.g., determined in a virtual environment, or the like) and compared against hash requirements. If the environment hash meets the hash requirement then the entity computer system may be allowed to remain on the network. Alternatively, if the environment hash fails to meet the hash requirement then the entity computer system may be isolated from the network and investigated for potential issues.

While the environment hashes are generally determined within the systems or the virtual systems discussed herein, in some embodiments, environment hashes may be shared between separate networks and entities. In this regard, third-parties may perform the validation process of the computer systems on the network in order to generate the environment hash outputs of the validated (e.g., "safe") computer systems, where the third party may have, for instance, an information-sharing relationship with the entity. In such embodiments, the system may be configured to import environment hash output values from a third party (e.g., a hash database server owned and/or operated by the third party) and incorporate the environment hash output values into the hash database (e.g., authorized environment hashes, unauthorized environment hashes, or the like). Alternatively, the environment hashes determined for the computer systems on the network of the present systems, may be shared with third parties and networks in order to share authorized and unauthorized environment hashes between different entities. In this way, the sharing of environment hashes (e.g., authorized or unauthorized) may allow for more efficient control of identifying unauthorized computer systems through different networks and/or entities sharing information about computer systems that may have potential harmful hardware, software, data, or the like (e.g., sharing between different internal networks within the entity and/or through external networks with other entities). Moreover, sharing the environment hashes between networks and entities reduces computer capacity, memory, and processing requirements because duplicative environment hash determinations are not run (e.g., the same environment hashes do not need to be determined for the same or similar computer systems on different networks and/or between different entities).

Consequently, as will be described in further detail herein, the system of the present disclosure confers a number of technological advantages over traditional network security systems. For instance, by using a virtual environment, the system may provide a secure, isolated way of performing validation and safety testing of executable code before it is deployed on target computing systems (e.g., computers within a production environment). Additionally, environment hashes provide an efficient way of identifying entity computer systems that may pose a potential threat to a network (e.g., without having to analyze the configurations of the entity computer system each time the entity computer system takes an action). Furthermore, maintaining a database of authorized hashes (or unauthorized hashes) may allow an entity to maintain precise version control with respect to configurations that may be installed on its computing systems.

Turning now to the figures, FIG. 1 illustrates an operating environment 100 for a secure virtual environment system, in accordance with embodiments of the present disclosure. In particular, FIG. 1 illustrates a secure virtual environment device 106 that is operatively coupled, via a communication network 2, to a target computing system 103 and a hash database system 104. In such a configuration, the secure virtual environment device 106 may, in some embodiments, transmit information to and/or receive information from the target computing system 103 and/or the hash database system 104. It should be understood that FIG. 1 illustrates only an exemplary embodiment of the operating environment 100, and it will be appreciated that one or more functions of the systems, devices, or servers as depicted in FIG. 1 may be combined into a single system, device, or server, or may be split between additional systems, devices, or severs. For instance, the functions of the secure virtual environment device 106 and the hash database system 104 may be performed by a single computing system. Furthermore, a single system, device, or server as depicted in FIG. 1 may represent multiple systems, devices, or servers (e.g., one or more of the foregoing). For instance, though the target computing system 103 is depicted as a single unit, the operating environment may comprise multiple target computing systems (as will be discussed in further detail with respect to FIG. 2).

The network may be a system specific distributive network receiving and distributing specific network feeds and identifying specific network associated triggers. The network may include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the secure virtual environment device 106 may be a computing system that hosts the virtual environment and allows for the testing of executable code as described elsewhere herein. Accordingly, the secure virtual environment device 106 may comprise a communication device 152, a processing device 154, and a memory device 156. The secure virtual environment device 106 may be a device such as a networked server, desktop computer, terminal, kiosk, or any other type of computing system as described herein. In other embodiments, the secure virtual environment device 106 may be a portable storage device such as a portable hard drive, flash memory drive, memory card, or the like. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 may be operatively coupled to the communication device 152 and the memory device 156 such that the processing device 154 uses the communication device 152 to communicate with the network and other devices on the network, such as, but not limited to the target computing system 103 and the hash database system 104. In this regard, the communication device 152 generally comprises any wired or wireless device, such as a modem, antennae, WiFi or Ethernet adapter, radio transceiver, electrical connection, electrical circuit, or other device for communicating with other devices on the network. The one or more communication devices 152 may further include an interface that accepts one or more network interface cards, ports for connection of network components, Universal Serial Bus (USB) connectors, or the like.

The memory device 156 may have computer-readable instructions 160 stored thereon, which in one embodiment includes the computer-readable instructions 160 of an virtual environment application 162, such as dedicated applications (e.g., apps, applet, or the like), portions of dedicated applications, web browser or other apps that allow access to applications located on other systems, or the like. The computer-readable instructions 160 may comprise computer-executable program code which may instruct the processing device 154 to perform certain logic, data processing, and data storing functions of the application to accomplish the entity's objectives. For instance, the virtual environment application 162 may contain the instructions needed to generate instances of the virtual environment for validation testing. In some embodiments, the memory device 156 includes data storage 158 for storing data related to the system environment.

As further illustrated in FIG. 1, the operating environment 100 may further comprise a target computing system 103. The target computer system 103 may be a computing system that is operated by a user 101, such as an administrator, agent, or employee of the entity. In other embodiments, the user 101 may be a user which is external to an organization, such as a customer or client of the organization. Accordingly, the target computing system 103 may be a device such as a desktop computer, IoT device, mobile device (e.g., phone, smartphone, tablet, laptop, single-board computer, or the like), or the like. The target computing system 103 may be in operative communication with the secure virtual environment device 106, the hash database system 104, other target computing systems 103. It should be understood that with respect to FIG. 1 the target computer systems 103 are described as a target in order to determine if the executable code is going to be allowed to be run on the target computer system 103. Alternatively, it should be understood that the target computer systems 103 may also be described as entity computer systems 103 as will be described in further detail with respect to FIGS. 2 through 4.

The target computing system 103 may comprise a processing device 134 operatively coupled to a communication device 132 and a memory device 136 having data storage 138 and computer readable instructions 140 stored thereon. As previously described herein, the communication may occur through the processing device 134 using the communication device 132 to communicate with the network and other devices on the network, such as, but not limited to other target computing system 103, the secure virtual environment device 106, the hash database system 104, and/or other like systems. In this regard, the communication device 132 generally comprises any wired or wireless device, such as a modem, antennae, WiFi or Ethernet adapter, radio transceiver, electrical connection, electrical circuit, or other device for communicating with other devices on the network. The one or more communication devices 132 may further include an interface that accepts one or more network interface cards, ports for connection of network components, Universal Serial Bus (USB) connectors and the like. Furthermore, the communication device 132 of the target computing system 103 may comprise one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like). As such, the one or more input devices may provide a user interface, such as a graphical user interface through which the user may interact with a user application 144 in order to enter information and/or through which the user may receive information The computer readable instructions 140 of the target computing system 103 may comprise a user application 144 which may receive inputs from the user 101 and produce outputs to the user 101. Accordingly, the user application 144 may include an operating system, application suite, or the like. In some embodiments, instances of the virtual environment may be modeled based on the target computing system 103 and the configuration (e.g., hardware and/or software) thereof.

The operating environment 100 may further comprise a hash database system 104. The hash database system 104 may be a computing system that may store hashes of executable code tested within the virtual environment or on the systems themselves. Accordingly, the hash database system 104 may comprise a processing device 174 operatively coupled to a communication device 172 and a memory device 176 comprising data storage 178 and computer readable instructions 180. A hash database 182 may be stored within the data storage 178 of the hash database system 104, where the hash database 182 contains the hashes of executable code that has been tested and/or environment hash of systems that have been tested. In some embodiments, the hash database 182 may be a validated hash database which stores hashes of executable code that has been validated (e.g., code that has been determined by the system to be safe to install and/or run). In other embodiments, the hash database 182 may be (or further include) an unauthorized hash database which stores hashes of executable code that is unauthorized (e.g., code that has been determined to produce undesirable effects) to be installed or executed on computing systems within the operating environment 100 (e.g., the target computing system 103). In embodiments in which the validated hashes are tied to certain computing systems, the hash database 182 may further comprise environment hashes of computing systems which have been authorized or not authorized to install and/or execute the executable code as defined by the system, access the network, or continuation to operate on the network.

The systems may use the communications devices described herein to communicate over a network, such as through a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively, or in addition to the wireless interface, the computing systems may also include a communication interface device that may be connected by a hardwire connection to the other systems on the network. The interface device may comprise a connector such as a USB, SATA, PATA, SAS or other data connector for transmitting data to and from the respective computing system. The communication devices may comprise one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The one or more processing devices of the computing systems described herein may each further be operatively coupled (e.g., communicably coupled, or the like) to devices such as one or more memory devices, output devices, input devices, network interfaces, power sources, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications (e.g., dedicated applications, apps, applets, applications accessed through a web browser, or the like), which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like. A processing device may also be capable of operating applications. The applications may be downloaded from a server and stored in the memory device of the computing systems. Alternatively, the applications may be pre-installed and stored in a memory in a chip. It should be understood that when discussing an application, the entire application may be located on a single system, or a portion of an application may be located on a single system, while other portions are located on one or more additional systems.

The chips of the systems may include the necessary circuitry to provide integration within the devices depicted herein. Generally, the chip will include data storage which may include data associated with the service that the computing systems may be communicably associated therewith.

The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The communication devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include one or more memory devices operatively coupled to the one or more processing devices. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like. The one or more memory devices may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a computer network environment 200 in which multiple entity computer systems 103 (e.g., target computer system 103) communicate with each other and other systems, including, but not limited to the hash database system 104 over a network 200. The communication may occur in the same or similar as was previously discussed herein with respect to communication of the systems described with respect to FIG. 1. The network environment 200 may be any type of network 2, such as an internal network, external network, cross-organizational network, or any type of network of entity computer systems 103. As illustrated in FIG. 2, the network 2 may comprise a first entity computer system 103a, a second entity computer system 103b, a third entity computer system 103c, a fourth entity computer systems 103d, up to an $n^{th}$ entity computer system 103n. As further illustrated in FIG. 2 the computer systems 103a-nth may correspond with a first user 101a, second user 101*b*, third user 101*c*, fourth user 101*c*, nth user 101*n*, or the like. As will be discussed in further detail herein with respect to FIG. 3 and FIG. 4, the use of the hashes discussed herein may aid in allowing and/or preventing access to the network (e.g., as discussed with respect to FIG. 3) and isolating systems already on the network (e.g., as discussed with respect to FIG. 4).

FIG. 3 illustrates a process flow 300 for determining authorization of an entity computer system to access a network through the use of environment hash outputs. As illustrated by block 310 in FIG. 3, an authentication request may be received from an entity (e.g., a user or an organization) using an entity computer system 103 (e.g., a user computer system, an organization computer system, or the like) to access the network (e.g., to access a single system, multiple systems, a single application, multiple applications, or the like over the network). The request may be received through an application on the entity computer system 103. The authentication request may be made automatically by the entity computer system 103 or manually by a user using the entity computer system 103. The authentication request made received before, during, or after the entity takes an action with respect to the network, such as, but not limited trying to access data, transfer data, store data, login to an application, utilize an application, or the like.

Block 320 of FIG. 3 further illustrates that authentication credentials may be requested from the entity making the request (e.g., from the user 101, an organization, or the like). The request for authentication credentials may include a request for the entity to provide authentication credentials, may include a request for an automatic response from the entity computer system 103 of the entity or another system for authentication credentials, or may automatically access the entity computer system 103 to determine authentication credentials. It should be understood that the authentication credentials may be anything that uniquely identifies the entity (e.g., the identity of the user or the organization) and/or the entity computer system (e.g., user computer system, organization computer system) from which the request to access the network is being received. For example, the authentication credentials may be an entity identifier (e.g., entity name, entity identification number, string of characters, e-mail address, phone number, or the like), entity password (e.g., string of characters, such as letters, numbers, and/or symbols, or the like), biometric information (e.g., fingerprint, eye scan, facial recognition, or the like), entity computer system identifier (e.g., IP address, model number, computer name, or the like), system location authentication (e.g., GPS, NFC, geo-fenced, or other location based authentication), and/or any other entity identifier that may identify the entity (e.g., the physical entity, computer system of the entity, or the like). The authentication credentials may provide a first factor authentication for the entity accessing the network. In other embodiments of the invention the authentication credentials together may provide multi-factor authentication.

Block 330 of FIG. 3 further illustrates that an environment hash may be requested for the entity system accessing the network. The environment hash may be requested directly from the entity system that is trying to access the network, form a secure virtual environment system 106 to determine an environment hash for the entity computer system 103 accessing the network, from a hash database system 104 for the entity computer system 103, and/or the like. In some examples, the entity computer system requesting to access the network may have a stored environment hash locally on the entity computer system or may be able to create an environment hash when the request is made to access the network. In other embodiments, the environment hash may be determined through the use of the secure virtual environment system 106 as previously discussed herein. That is, before the entity computer system 103 is allowed to access the network the configuration of the entity computer system 103 is analyzed virtually using the secure virtual environment system 106. In other embodiments, the environment hash for the entity computer system 103 may be stored on a hash database system 104. The environment hash stored on the entity computer system 103 or on the hash database system 104 is based on the most recent configuration for the entity computer system 103.

As illustrated by block 340 in FIG. 3 authentication requirements may be stored on a system, such as an authentication credential system. The authentication credentials may include the authentication credentials for the entity trying to access the network (e.g., the user or organization and/or the user computer system or organization computer system) and/or other requirements (e.g., time requirements for providing the authentication credentials, or the like) that are to be meet before validating the entity. The stored authentication credentials may be used to determine if the authentication credentials received from the entity match, as will be described with respect to block 360.

Block 350 of FIG. 3 further illustrates that hash requirements may be accessed in order to determine if the received environment hash meets the hash requirements. The hash requirements may be stored authorized environment hashes (e.g., stored environment hashes that are allowed to access the network), stored unauthorized hashes (e.g., stored environment hashes that should be prevented from accessing the network), requirements for differences between past environment hashes and current environment hashes for the same system (e.g., indicating that the configuration of the computer system has changed), hashes that make a number or percentage of the computer systems on the network higher or lower than a threshold requirement (e.g., a percentage of computer systems with a specific environment hash or a grouping of environment hashes may indicate that harmful code may be spreading), or other hash requirements. Like the authentication requirements discussed with respect to block 340, the hash requirements may be stored on a system that is accessed when the entity computer system 103 make a request to access the network.

As illustrated by block 360, the entity (e.g., the user or organization, the user computer system or the organization computer system) is validated based on a comparison of the authentication credentials with the authentication requirements (e.g., at least one authentication requirement as a first factor) and the environment hash to the hash requirements (e.g., as at least a second factor). As such, access to the network (e.g., a system, application, or the like thereon) may be based not only on the authentication credentials of the entity, but also on a determination of potential issues regarding the configuration of the entity computer system as represented by the environment hashes discussed herein. In particular, by utilizing the environment hashes of entity computer systems 103, the entity computer systems 103 may be quickly validated instead of having to check the actual configuration of each of the entity computer systems when the individual entity computer systems try to access the network. That is, without the use of the environment hash, it would be too time consuming to analyze the configuration of each entity computer system when the entity computer systems 103 tried to access the network. The use of the environment hashes described herein improves the speed, capacity, and memory storage of the systems tasked with maintaining the security of the network. Moreover, the environment hashes also provide improved ways for identifying potential security issues with entity computer systems accessing the network and mitigating the potential security issues by updating the configurations of the entity computer systems, as will be described in further detail herein.

Block 370 of FIG. 3 illustrates that the entity is allowed to access the network when the entity is validated using the at least two-factor authentication. For example, when both the authentication credentials meet the authentication requirements and when the environment hash of the entity computer system meets the hash requirements, the entity can access the network using the entity computer system.

Alternatively, as illustrated by block 380 of FIG. 3, the entity is prevented from accessing the network using the entity computer system when either the authentication credentials fail to meet the authentication requirements, or the environment hash fails to meet the hash requirements. In some embodiments, when the entity is prevented from accessing the network, the entity may also be prevented from making future requests. For example, when an entity computer system is prevented from accessing the network (e.g., due to the environment hash not meeting the hash requirements), a computer identifier for the entity computer system may be stored. As such, when the entity computer system subsequently tries to communicate with the network, the computer identifier for the entity computer system is identified. Should the computer identifier trying to communicate with the network matches the stored computer identifier, the entity computer system may be prevented from communicating with the network (e.g., making a request, or the like).

As will be described in further detail with respect to FIG. 4 should the entity computer system be found to have an environment hash that does not meet the hash requirements, then the configuration of the entity computer system may be analyzed and updated. Consequently, after updating the entity computer system, the entity would likely have a configuration that results in an environment hash that meets the hash requirements, and thus, would allow the entity computer system to access the network.

FIG. 4 illustrates a process flow 400 for isolating an entity computer system for security purposes. As illustrated in block 410 the entity computer systems 103 on the network are monitored over time, and environment hashes are determined for the entity computer systems 103. It should be understood that the environment hashes may be determined as previously discussed herein. In some embodiments the entity computer systems may be monitored for configuration changes, such as new or updated hardware or software, new files saved on the entity computer system, new code executed on the entity computer system, the failure for new or updated hardware or software to be implemented on the entity computer system, or the like. Should any of the forgoing events (e.g., changes or failure of the changes) occur, the events may trigger the determination of an environment hash. Alternatively, the entity computer systems on the network may be accessed (e.g., periodically over a time frame, or the like) in order to determine the current environment hashes of the entity computer systems that have access to the network (e.g., currently on the network, are allowed to connect to the network, or the like). It should be understood that the environment hashes may be determined on a virtual environment system 106 as previously described herein. Alternatively, the environment hashes may be determined by the entity computer systems themselves. Regardless of when, how, and why the environment hashes are determined, the environment hashes as previously described herein, may be a representation of the configurations of the entity computer systems on the network.

Block 420 of FIG. 4 illustrates that the environment hashes for the entity computer systems are stored. For example, each time an environment hash is created it is stored for use in the future. Alternatively, the environment hash is only stored for a particular entity computer system when the most recent environment hash determined is different than the previously stored environment hash (e.g., when the new environment hash is different than the last environment hash). The environment hashes may be stored on the hash database system 104 or another system that is within out outside of the network.

FIG. 4 further illustrates in block 430 that the environment hashes determined for the entity computer systems are compared to hash requirements. As previously discussed, the hash requirements may be accessed in order to determine if the recently determined environment hash meets the hash requirements. The hash requirements may be authorized environment hashes (e.g., stored environment hashes that may remain on the network), stored unauthorized hashes (e.g., stored environment hashes that should be removed from the network), past environment hashes of the same system (e.g., in order to determine that the configuration of the entity computer systems has changed), hashes that may be different from the other hashes on the network, hashes that make a number or percentage of the computer systems on the network higher or lower than a threshold requirement (e.g., a percentage of computer systems with a specific environment hash or a grouping of environment hashes may indicate that harmful code may be spreading), or other like hash requirements.

As illustrated by block 440 in FIG. 4, the entity computer systems are allowed to maintain access to the network when the environment hash for the entity computer systems meet the hash requirements. Alternatively, as illustrated by block 450, when the entity computer systems fail to meet the hash requirements, the one or more entity computer systems that fail to meet the hash requirement are isolated from the network. For example, the entity computer systems that are isolated from the network (e.g., isolated entity computer systems) may be removed from the network, prevented from accessing the network, and/or placed on a separate isolation network. In this way the entity computer systems that have been isolated from the network may be investigated, as described in further detail below.

FIG. 4 further illustrates in block 460 that after the entity computer system(s) have been isolated, the change in the entity computer system(s) that resulted in the environment hash may be identified. For example, the entity computer system(s) may be investigated to identify new hardware or software, updated hardware or software, lack of hardware or software that should be on the entity computer system, the recent of execution of code that changed a configuration, or other like changes to system configurations on the entity computer system(s). In this way, the specific hardware, software, executed code, and/or the like that resulted in the environment hash that failed to meet the hash requirements may be identified. This investigation of the entity computer system may occur on the virtual environment system 106 to restrict the potential of any potential harmful code from spreading the entity computer system being investigated. Consequently, the investigation of the entity computer system may result in a determination if any data was corrupted, if unauthorized changes were made to system configurations, if any changes made to configurations were accidental, if configuration issues occurred due to system drift, or if other issues were the cause or a result of specific configuration changes.

Block 470 of FIG. 4 further illustrates that the entity computer system(s) may be updated after the identification of the configuration changes described with respect to block 460. For example, hardware or software may be removed, the hardware or software may be updated, or missing hardware or software may be downloaded to the entity computer system(s). Moreover, corrupted data may be removed from the entity computer system.

FIG. 4 further illustrates in block 480 that updated environment hashes may be created for the entity computer systems after the entity computer systems have been updated. It should be understood that the environment hashes may be created based on the updates made to the entity computer system(s), in the same way as the environment hashes were previously described as being created herein.

As illustrated in block 490 of FIG. 4, the updated environment hashes for the updated entity computer system(s) may be compared to the hash requirements to make sure that the entity computer systems will be allowed on the network. Moreover, the updated environment hashes are stored for future comparisons. In some embodiments, the updated environment hashes are stored in the hash database system 104 or another system (e.g., other database systems, or the like).

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

| Docket Number | U.S. patent application Ser. No. | Title | Filed On |
| --- | --- | --- | --- |
| 9664US1.014033.3705 | 16/850,525 | VIRTUAL ENVIRONMENT SYSTEM FOR SECURE EXECUTION OF PROGRAM CODE USING CRYPTOGRAPHIC HASHES | Concurrently herewith |
| 9727US1.014033.3714 | 16/850,561 | SYSTEM FOR ANALYSIS AND AUTHORIZATION FOR USE OF EXECUTABLE ENVIRONMENT DATA IN A COMPUTING SYSTEM USING HASH OUTPUTS | Concurrently herewith |
| 9728US1.014033.3715 | 16/850,485 | VIRTUAL ENVIRONMENT SYSTEM FOR VALIDATING EXECUTABLE DATA USING ACCELERATED TIME-BASED PROCESS EXECUTION | Concurrently herewith |
| 9731US1.014033.3717 | 16/850,797 | SYSTEM FOR NETWORK ISOLATION OF AFFECTED COMPUTING SYSTEMS USING ENVIRONMENT HASH OUTPUTS | Concurrently herewith |

What is claimed is:

1. A system for improving security of networks using environment hashes, the system comprising:

one or more memory devices storing computer-readable code; and one or more processing devices operatively coupled to the one or more memory devices, wherein the one or more processing devices are configured to execute the computer-readable code to:

receive a request from an entity to access a network through the use of an entity computer system;

receive authentication credentials from the entity;

compare the authentication credentials from the entity with authentication requirements;

identify an environment hash for the entity computer system, wherein the environment hash comprises a cryptographic hash output value comprising of a fixed-length character string, wherein identifying the environment hash comprises accessing a shared hash database comprising a plurality of environment hashes for a plurality of entity computer systems and identifying the environment hash for the entity computer system, wherein the shared hash database is populated with the plurality of environment hashes from a plurality of third party entities, and wherein the plurality of environment hashes comprise authorized environment hashes and unauthorized environment hashes;

compare the environment hash for the entity computer system with hash requirements;

allow the entity computer system to access the network when the entity computer system is validated based on the comparison of the authentication credentials and the authentication requirements and the environment hash and the hash requirements; and prevent the entity computer system from accessing the network when the entity computer system fails to be validated based on the comparison of the authentication credentials and the authentication requirements or the environment hash and the hash requirements.

2. The system of claim 1, wherein identifying the environment hash comprises identifying the environment hash stored on the entity computer system, accessing the shared hash database when the environment hash is not stored on the entity computer system, and determining the environment hash when the environment hash is not stored in the shared hash database.

3. The system of claim 1, wherein the one or more processing devices are further configured to execute the computer-readable code to:
- monitor the entity computer system for a configuration change;
- determine a new environment hash when the configuration change occurs; and
- share the new environment hash for the entity computer system for storage in the shared hash database.

4. The system of claim 1, wherein identifying the environment hash comprises creating the environment hash based on a configuration of the entity computer system.

5. The system of claim 1, further comprising:
- preventing the entity computer system from making future requests when the entity computing system is prevented from accessing the network.

6. The system of claim 5, wherein preventing the entity computer system from making the future requests comprises:
- identifying a computer identifier for the entity computer system;
- store the computer identifier as a stored computer identifier for restricting communication with the network;
- identify the entity computer system is trying to communicate with the network;
- determine the computer identifier of the entity computer system matches the stored computer identifier; and
- prevent the entity computer system from making a second request on the network.

7. The system of claim 1, wherein the authentication credentials comprise a user identifier and a password, a secure token, biometric information, a computer identifier, an image, or a gesture.

8. A method for improving security of networks using environment hashes, the method comprising:
- receiving, by one or more processors, a request from an entity to access a network through the use of an entity computer system;
- receiving, by the one or more processors, authentication credentials from the entity;
- comparing, by the one or more processors, the authentication credentials from the entity with authentication requirements;
- identifying, by the one or more processors, an environment hash for the entity computer system, wherein the environment hash comprises a cryptographic hash output value comprising of a fixed-length character string, wherein identifying the environment hash comprises accessing a shared hash database comprising a plurality of environment hashes for a plurality of entity computer systems and identifying the environment hash for the entity computer system, wherein the shared hash database is populated with the plurality of environment hashes from a plurality of third party entities, and wherein the plurality of environment hashes comprise authorized environment hashes and unauthorized environment hashes;
- comparing, by the one or more processors, the environment hash for the entity computer system with hash requirements;
- allowing, by the one or more processors, the entity computer system to access the network when the entity computer system is validated based on the comparison of the authentication credentials and the authentication requirements and the environment hash and the hash requirements; and
- preventing, by the one or more processors, the entity computer system from accessing the network when the entity computer system fails to be validated based on the comparison of the authentication credentials and the authentication requirements or the environment hash and the hash requirements.

9. The method of claim 8, wherein identifying the environment hash comprises identifying the environment hash stored on the entity computer system, accessing the shared hash database when the environment hash is not stored on the entity computer system, and determining the environment hash when the environment hash is not stored in the shared hash database.

10. The method of claim 8, wherein the method further comprises:
- monitoring, by the one or more processors, the entity computer system for a configuration change;
- determining, by the one or more processors, a new environment hash when the configuration change occurs; and
- sharing, by the one or more processors, the new environment hash for the entity computer system for storage in the shared hash database.

11. The method of claim 8, wherein identifying the environment hash comprises creating the environment hash based on a configuration of the entity computer system.

12. The method of claim 8, further comprising:
- preventing the entity computer system from making future requests when the entity computing system is prevented from accessing the network.

13. The method of claim 12, wherein preventing the entity computer system from making the future requests comprises:
- identifying a computer identifier for the entity computer system;
- store the computer identifier as a stored computer identifier for restricting communication with the network;
- identify the entity computer system is trying to communicate with the network;
- determine the computer identifier of the entity computer system matches the stored computer identifier; and
- prevent the entity computer system from making a second request on the network.

14. The method of claim 8, wherein the authentication credentials comprise a user identifier and a password, a secure token, biometric information, a computer identifier, an image, or a gesture.

15. A computer program product for improving security of networks using environment hashes, the computer program product comprising at least one non-transitory computer-readable medium having computer-readable program code portions embodied therein, the computer-readable program code portions comprising:
- an executable portion configured to receive a request from an entity to access a network through the use of an entity computer system;
- an executable portion configured to receive authentication credentials from the entity;
- an executable portion configured to compare the authentication credentials from the entity with authentication requirements;
- an executable portion configured to identify an environment hash for the entity computer system, wherein the environment hash comprises a cryptographic hash output value comprising of a fixed-length character string, wherein identifying the environment hash comprises accessing a shared hash database comprising a plurality of environment hashes for a plurality of entity computer systems and identifying the environment hash for the entity computer system, wherein the shared hash database is populated with the plurality of environment hashes from two or more a plurality of third party entities, and wherein the plurality of environment hashes comprise authorized environment hashes and unauthorized environment hashes;

an executable portion configured to compare the environment hash for the entity computer system with hash requirements;

an executable portion configured to allow the entity computer system to access the network when the entity computer system is validated based on the comparison of the authentication credentials and the authentication requirements and the environment hash and the hash requirements; and an executable portion configured to prevent the entity computer system from accessing the network when the entity computer system fails to be validated based on the comparison of the authentication credentials and the authentication requirements or the environment hash and the hash requirements.

16. The computer program product of claim 15, wherein the executable portion configured to identify the environment hash comprises identifying the environment hash stored on the entity computer system, accessing the shared hash database when the environment hash is not stored on the entity computer system, and determining the environment hash when the environment hash is not stored in the shared hash database.

17. The computer program product of claim 15, wherein the computer-readable program code portions further comprise:

an executable portion configured to monitor the entity computer system for a configuration change;

an executable portion configured to determine a new environment hash when the configuration change occurs; and an executable portion configured to share the new environment hash for the entity computer system for storage in the shared hash database.

18. The computer program product of claim 15, wherein identifying the environment hash comprises creating the environment hash based on a configuration of the entity computer system.

19. The computer program product of claim 15, wherein the computer-readable program code portions further comprise:

an executable portion configured to prevent the entity computer system from making future requests when the entity computing system is prevented from accessing the network.

20. The computer program product of claim 19, preventing the entity computer system from making the future requests comprises:

identifying a computer identifier for the entity computer system;

store the computer identifier as a stored computer identifier for restricting communication with the network;

identify the entity computer system is trying to communicate with the network;

determine the computer identifier of the entity computer system matches the stored computer identifier; and prevent the entity computer system from making a second request on the network.

* * * * *